March 25, 1958     H. KRUGER     2,827,791
MOVEMENT TRANSMISSION DEVICE

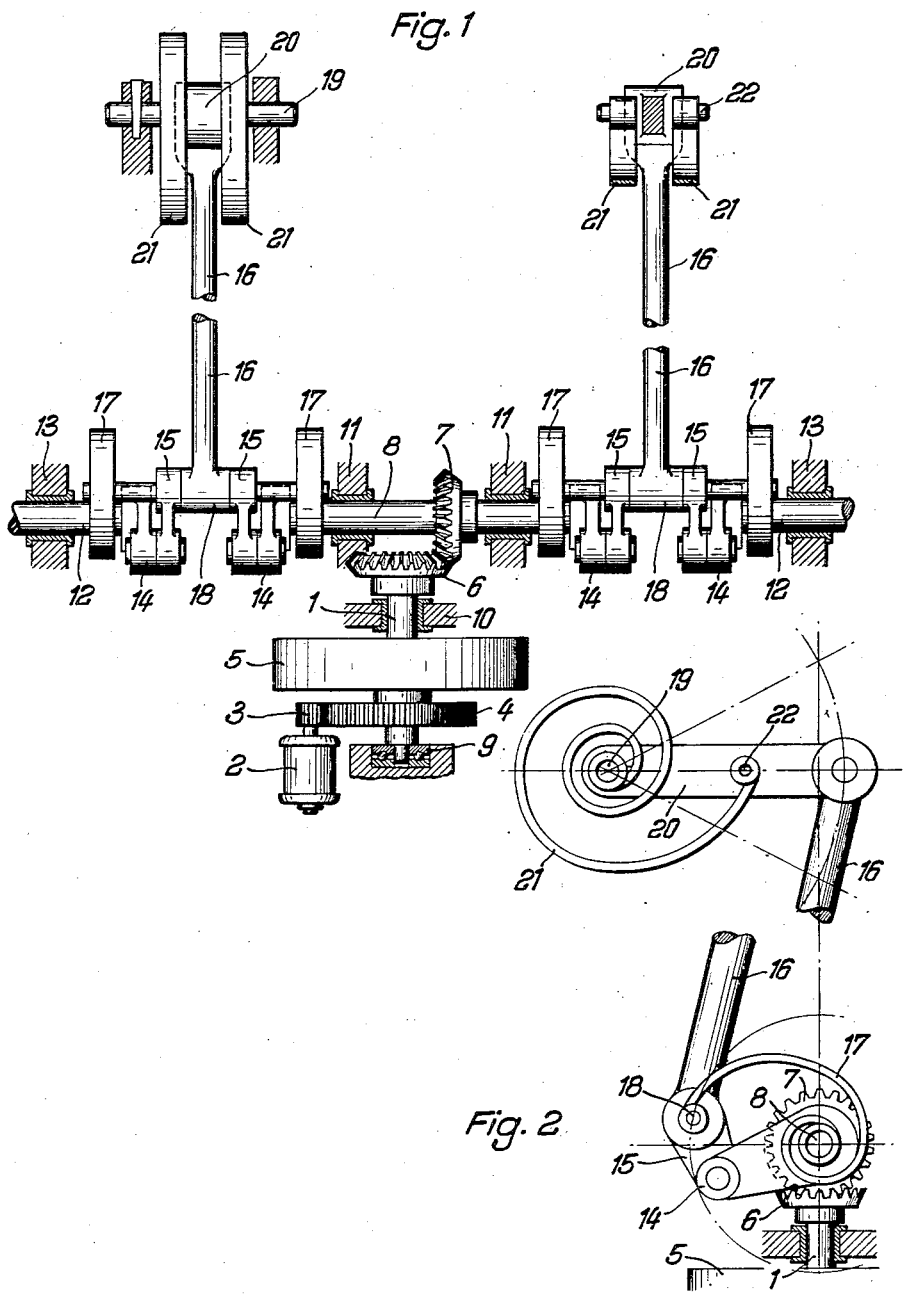

Filed Nov. 3, 1954     2 Sheets-Sheet 2

Inventor:
Hans Krüger
By Adolf O. Berglein
Atty.

United States Patent Office 2,827,791
Patented Mar. 25, 1958

2,827,791

MOVEMENT TRANSMISSION DEVICE

Hans Kruger, Hamburg, Germany

Application November 3, 1954, Serial No. 466,520

4 Claims. (Cl. 74—44)

The present invention relates to a movement transmission device, particularly for the driving of vehicles or other driving arrangements or for transferring rotary movement into oscillating movement.

The object of the invention is to improve the known movement transmission devices, in which rotary movement is transferred into oscillating movement, such as for the driving of oscillating wings of wing-flapping machines, elastic oscillating fins of water-crafts, or means for propulsion by recoil of the oscillating type provided for cross-country vehicles, and which, moreover, permit the transmission of the motion of the driving mechanism or driving means of this kind in such manner that loss of energy is reduced to a minimum and corresponding reduction of the required driving power is thereby made possible.

For this purpose the method according to the invention comprises in combination with a driving shaft rotatable crank lever mechanisms in cooperative driving connection with said driving shaft, a crank arm rigidly connected on said shaft, a joint member pivotally connected with the free end of said crank arm and an elastic crank arm formed by one or a plurality of oscillating leaf springs having spiral-like formation, one end of which being fixed to said crank shaft, whereas the other end of said spring is pivotally connected with the free end of said joint member, a connecting rod for each crank lever mechanism, one end of which being pivotally connected with said joint member and fixed to said corresponding oscillating leaf spring, one or a plurality of oscillating levers pivotally mounted at one end on a stationary shaft, whereas the other end is pivotally connected with said connecting rod, moving masses in connection and cooperation with said rotating crank lever mechanisms, oscillating spring mechanisms between said stationary shaft and said oscillating levers for resiliently holding said oscillating lever in an intermediate position between the end positions of its oscillating movement, consisting of one or a plurality of springs having spiral-like formation and being fixed at their ends to said stationary shaft and the corresponding oscillating lever, all oscillating or rotating parts of the transmission device being in cooperative and mutual driving connection with each other and said moving masses as to form an elastic power and movement transmission mechanism.

Said spring mechanisms between said stationary shaft and said oscillating levers consist of one or a plurality of leaf springs having spiral-like formation one end of which being fixed to said stationary shaft, whereas the other end is fixed to an intermediate point of said oscillating lever spaced from said stationary shaft.

Preferably as driving shaft a motor driven fly-wheel shaft and a transmission gear consisting of bevelled teeth wheels in driving connection with said fly wheel shaft are used for driving said crank lever mechanisms, and for transferring rotary movement into oscillating movement.

In the elastic power and movement transmission device thus formed moving masses, such as the upper oscillating lever, the connecting rod, and possibly also additional moving masses, become effective in cooperation and mutual driving connection with the oscillating spring mechanisms formed by the spiral-like springs.

By means of this power and movement transmission device, in which the forces of oscillating and rotating masses and of the oscillating springs are alternately active and mutually affecting each other, especially the start of the transferring movement and is made easier the quantity of driving energy needed is considerably reduced.

In order to facilitate the power transmission from the crank-shaft to the pendulum-spring-arrangement and the return-transmission of the energy from the latter to the crank-shaft, according to the invention the crank mechanism is provided with a semi-elastic combined crank. Owing to the feature that the connecting rod directly acts upon the crank pin, which is rigidly fastened to the elastic crank arm, it is achieved that the forces alternately acting in the crank mechanism between crank and oscillating-spring-mechanism are always received and transmitted by the rigid crank arm at the most favorable angle, that is to say, in the direction of its circular movement.

Additional features and advantages of the invention will be understood from a consideration of the following detailed description taken in connection with the accompanying drawings, forming a part of this specification and in which an embodiment of the invention has been shown by way of example. However, I wish to say that the invention is not confined to any strict conformity with the showing of the drawings, but may be changed or modified, so long as such changes or modifications mark no material departure from the salient features of the invention as expressed in the appended claims.

In the drawings

Fig. 1 is a vertical front view of an embodiment of the movement transmission device provided with two crank mechanisms;

Fig. 2 is a side-view of the embodiment of Fig. 1;

Figure 3:
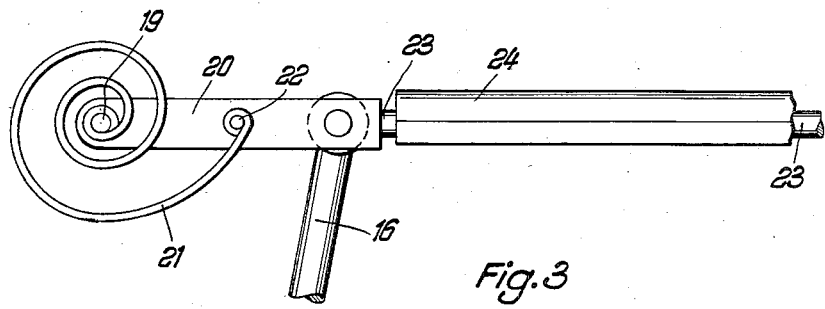
Fig. 3 is an illustration, supplementary to that of Fig. 1, showing an oscillating lever with an oscillating spring-mechanism and the connecting rod connected to the supporting wings of a wing-flapping machine in side elevation.

Referring now to the drawings in detail, the reference numeral 1 designates a driving shaft which in the embodiment illustrated in Figs. 1 and 2 is driven from a motor 2 via the teeth wheels 3, 4. The driving shaft 1 carries a flywheel mass 5 and is, via the gear with bevelled teeth wheels 6, 7, in driving connection with a crankshaft 8. The driving shaft 1 is supported in the bearings 9 and 10, while the shaft 8 is supported in the bearings 11. In line with the crank-shaft 8, there are provided additional crank-shafts 12 supported in bearings 13. Rigidly connected to the crank-shafts 8, 12 are preferably spiral-like springs as elastic crank-arms 17 and rigid crank-arms 14 at the outer ends of the latter by joint-members 15 or the like are pivotally mounted. The spiral-like springs 17a as elastic crank-arms 17 are at their outer end fixed to one end of connecting rods 16, which are pivotally connected to the free ends of the joint-members 15.

The other ends of the connecting rods 16 are rotatably connected to oscillating levers 20, which are rotatably mounted with one end on stationary shafts 19 and subjected to the action of spiral-like springs 21, which are fixed at one end to the stationary shaft 19 and at the other end to the pivot-bolt 22 of the oscillating lever 20 spaced from the shaft 19. Every crank lever mechanism consists of one elastic crank-arm 17, one rigid crank-arm 14, and one joint-member 15. There are provided for every oscillating lever 20 on each side of the latter a spiral-like spring 21.

In the embodiment illustrated in the drawings there are arranged on one crank-shaft 8 two crank mechanisms with connecting rods 16 which are acting in the same direction of rotation. If it is desired that the crank mechanism and connecting rods 16 should act in opposite directions, then the crank-shaft 8 has to be interrupted above the bevel wheel 6, whereupon each of the two shafts 8 has to be provided with a bevel wheel 7, and both wheels 7 are in mesh with the common bevel wheel 6. By these means the two separated crank-shafts 8 rotate in opposite direction.

Figure 4:
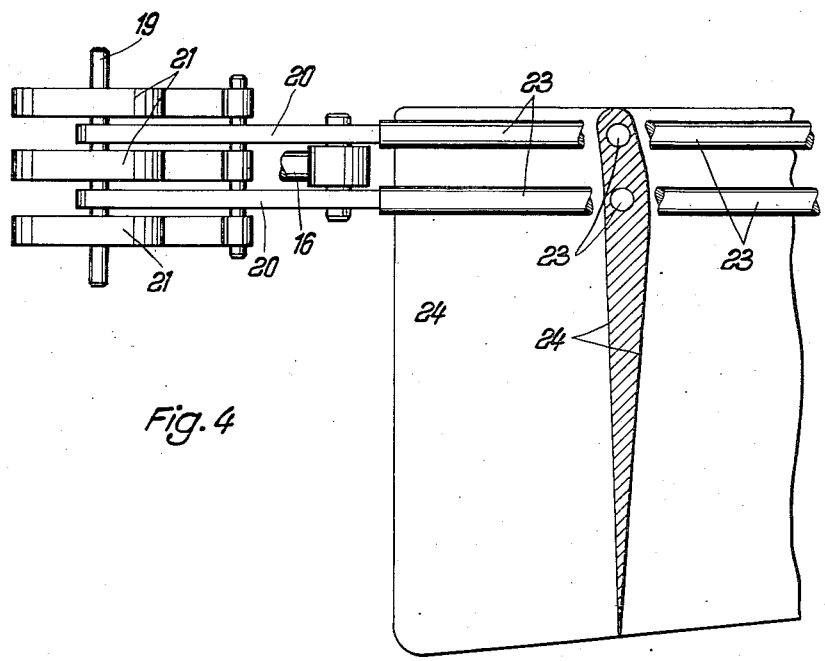
Fig. 4 is a top-view of the illustration of Fig. 3.

In Figs. 3 and 4 the reference numeral 16 designates again the connecting rod, while 20 are again the oscillating levers rotatably mounted on stationary shafts 19, and 21 the spiral-like springs rigidly fixed at one end to the stationary shafts 19 and at the other end to the pivots 22 at the oscillating levers 20. The latter are (as practical possibility of use of the movement transmission device) rigidly connected to spars 23 for the flapping and supporting wings 24 of wing-flapping machines. These flapping and supporting wings 24 may have the cross-section indicated in Fig. 4 of the drawings. The transmission device according to the invention may be used for instance to transfer rotating movement into oscillating movement. If large masses or any movable part with large resistance have to be moved at the beginning of the motion, the spring mechanisms between the crank shaft 8 and the connecting rods 16 will be tensioned and this tension will assist the driving power of the motor 2.

The spring mechanisms between the stationary shaft 19 and the oscillating levers 20 will be tensioned during the driving movement of the oscillating levers from their central position of rest, as shown in Fig. 3, into their end positions of the oscillating movement and will assist the return movement of the oscillating levers 20 from their end positions into the central position therebetween. By this means the motor 2 can be of less power, as the needed driving power at the beginning of any driving movement is much reduced. These and many other advantages are attained with the elastic power and movement transmission device.

What I claim as new and desire to secure by Letters Patent of the United States is:

1. Movement transmission device, particularly for the driving of vehicles or other driving arrangements, comprising in combination with a driving shaft, rotatable crank lever mechanisms in cooperative driving connection with driving shaft, each of said crank lever mechanism consisting of a rotatable crank shaft, a crank arm rigidly connected on said crank shaft, a joint member pivotally connected with the free end of said crank arm and an elastic crank arm formed by one or a plurality of oscillating leaf springs having spiral-like formation one end of which being fixed to said crank shaft whereas the other end of said spring is pivotally connected with the free end of said joint member, a connecting rod for each crank lever mechanism, one end of which being pivotally connected with said joint member and fixed to said corresponding oscillating leaf spring, one or a plurality of oscillating levers pivotally mounted at one end on a stationary shaft, whereas the other end is pivotally connected with said connecting rod, moving masses in connection and cooperation with said rotating crank lever mechanisms, oscillating spring mechanisms between said stationary shaft and said oscillating levers for resiliently holding said oscillating lever in an intermediate position between the end positions of its oscillating movement, consisting of one or a plurality of springs having spiral-like formation and being fixed at their ends to said stationary shaft and the corresponding oscillating lever, all oscillating or rotating parts of the transmission device being in cooperative and mutual driving connection with each other and said moving masses as to form an elastic power and movement transmission mechanism.

2. Movement transmission device, particularly for the driving of vehicles or other driving arrangements, comprising in combination with a driving shaft, rotatable crank lever mechanisms in cooperative driving connection with driving shaft, each of said crank lever mechanism consisting of a rotatable crank shaft, a crank arm rigidly connected on said crank shaft, a joint member pivotally connected with the free end of said crank arm and an elastic crank arm formed by one or a plurality of oscillating leaf springs having spiral-like formation one end of which being fixed to said crank shaft whereas the other end of said spring is pivotally connected with the free end of said joint member, a connecting rod for each crank lever mechanism, one end of which being pivotally connected with said joint member and fixed to said corresponding oscillating leaf spring, one or a plurality of oscillating levers pivotally mounted at one end on a stationary shaft, whereas the other end is pivotally connected with said connecting rod, moving masses in connection and cooperation with said rotating crank lever mechanisms, oscillating spring mechanisms between said stationary shaft and said oscillating levers consisting of one or a plurality of leaf springs having spiral-like formation, one end of which being fixed to said stationary shaft, whereas the other end is fixed to an intermediate point of said oscillating lever, spaced from said stationary shaft, all rotating or oscillating parts of the transmission device being in cooperative and mutual driving connection with each other and said moving masses as to form an elastic power and movement transmission mechanism.

3. Movement transmission device, particularly for transferring rotary movement into oscillating movement, comprising in combination with a motor-driven rotatably fly-wheel shaft and a transmission gear consisting of bevelled teeth wheels in driving connection with said fly-wheel shaft, rotatable crank lever mechanisms cooperating with said transmission gear and said fly-wheel shaft, each of said crank lever mechanisms consisting of a rotatable crank shaft, a rigid crank arm and an elastic crank arm formed by one or a plurality of oscillating leaf springs having spiral-like formation, both crank arms being fixed to said crank shaft, a joint member, one end of which being pivotally mounted on the free end of said rigid crank arm and its other end being pivotally connected with the free end of said elastic crank arm, a connecting rod for each crank lever mechanism, one end of which being pivotally connecting to said joint member and fixed to said elastic crank arm, one or a plurality of oscillating levers pivotally mounted at one end on a stationary shaft, whereas the other end is pivotally connected with said connecting rod, moving masses in connection and cooperation with said rotating crank lever mechanisms, oscillating mechanisms between said stationary shaft and said oscillating levers consisting of one or a plurality of leaf springs having spiral-like formation, one end of which being fixed to said stationary shaft, whereas the other end is fixed to an intermediate point of said oscillating lever spaced from said stationary shaft, all rotating or oscillating parts of the transmission device being in cooperative and mutual driving connection with each other and said moving masses as to form an elastic power and movement transmission mechanism.

4. Movement transmission device, particularly for a transferring rotary movement into oscillating movement, comprising in combination with a motor-driven rotatably fly-wheel shaft and a transmission gear consisting of bevelled teeth wheels in driving connection with said fly-wheel shaft, a plurality of rotatable crank lever mechanisms with crank shafts being driven by said bevelled teeth wheels in opposite directions, a rigid crank arm and an elastic crank arm formed by one or a plurality of oscillating leaf springs having spiral-like formation, both crank arms being fixed to said crank-shaft, a joint member, one end of which being pivotally mounted on the free end of said rigid crank arm, and its other end being pivotally connected with the free end of said elastic crank arm, a connecting rod for each crank lever mechanism, one end of which being pivotally connecting to said joint member and fixed to said elastic crank arm, one or a plurality of oscillating levers pivotally mounted at one end on a stationary shaft, whereas the other end is pivotally connected with said connecting rod, moving masses in connection and cooperation with said rotating crank lever mechanisms, oscillating mechanisms between said stationary shaft and said oscillating levers consisting of one or a plurality of leaf springs having spiral-like formation one end of which being fixed to said stationary shaft, whereas the other end is fixed to an intermediate point of said oscillating lever spaced from said stationary shaft, all rotating or oscillating parts of the transmission device being in cooperative and mutual driving connection with each other and said moving masses as to form an elastic power and movement transmission mechanism.

References Cited in the file of this patent

UNITED STATES PATENTS

| | | |
|---|---|---|
| 23,048 | Spalding | Feb. 28, 1859 |
| 592,195 | Childress | Oct. 19, 1897 |
| 889,304 | Hamric | June 2, 1908 |
| 929,919 | Dahl | Aug. 3, 1909 |
| 2,039,598 | Kaemmerlen | May 5, 1936 |

FOREIGN PATENTS

| | | |
|---|---|---|
| 992,651 | France | Oct. 22, 1951 |